(12) United States Patent
Dymond et al.

(10) Patent No.: US 12,015,322 B2
(45) Date of Patent: Jun. 18, 2024

(54) ELECTRIC MOTOR

(71) Applicant: Dyson Technology Limited, Wiltshire (GB)

(72) Inventors: Nigel Youatt Dymond, Swindon (GB); Lin Ji, Swindon (GB); Kevin Garcia, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 16/976,797

(22) PCT Filed: Feb. 19, 2019

(86) PCT No.: PCT/GB2019/050447
§ 371 (c)(1),
(2) Date: Aug. 31, 2020

(87) PCT Pub. No.: WO2019/166775
PCT Pub. Date: Sep. 6, 2019

(65) Prior Publication Data
US 2020/0412198 A1    Dec. 31, 2020

(30) Foreign Application Priority Data
Mar. 1, 2018   (GB) ...................................... 1803348

(51) Int. Cl.
*H02K 5/24*   (2006.01)
*H02K 5/173*   (2006.01)
(Continued)

(52) U.S. Cl.
CPC ............. *H02K 5/1732* (2013.01); *H02K 5/24* (2013.01); *H02K 9/06* (2013.01); *H02K 7/083* (2013.01)

(58) Field of Classification Search
CPC .......... H02K 5/1732; H02K 5/24; H02K 9/06; H02K 7/083
(Continued)

(56) References Cited

U.S. PATENT DOCUMENTS 7,834,501 B2 *  11/2010  Childe ................... F16C 35/077
                                                        310/90
8,893,847 B2 *  11/2014  Imanishi .............. B62D 5/0427
                                                        180/443
(Continued)

FOREIGN PATENT DOCUMENTS

CN       105449909 A      3/2016
CN       106877556 A      6/2017
(Continued)

OTHER PUBLICATIONS

International Search Report and Written Opinion dated May 22, 2019, directed to International Application No. PCT/GB2019/050447; 13 pages.
(Continued)

*Primary Examiner* — Terrance L Kenerly
(74) *Attorney, Agent, or Firm* — Tucker Ellis LLP (57) ABSTRACT

An electric motor having a frame, a rotor assembly, and a stator assembly. The rotor assembly has a magnet, a bearing assembly, an impeller, and a shaft. The bearing assembly has a first bearing, a second bearing, and a biasing element between the first and second bearings. The first bearing is mounted to the frame by an o-ring, and the second bearing is mounted to the frame by adhesive.

15 Claims, 5 Drawing Sheets

(51) Int. Cl.
*H02K 9/06* (2006.01)
*H02K 7/08* (2006.01)

(58) Field of Classification Search
USPC .................................................. 310/90, 40 R
See application file for complete search history.

(56) References Cited

U.S. PATENT DOCUMENTS

| | | |
|---|---|---|
| 2004/0134708 A1 | 7/2004 | Tanaka et al. |
| 2007/0230839 A1 | 10/2007 | Childe et al. |
| 2014/0090626 A1 | 4/2014 | An et al. |
| 2014/0328684 A1* | 11/2014 | King ..................... F04D 29/056 416/95 |
| 2016/0087505 A1 | 3/2016 | Turner et al. |
| 2017/0164710 A1* | 6/2017 | Warne ..................... A45D 20/12 |
| 2017/0170709 A1 | 6/2017 | Barnes et al. |
| 2018/0252266 A1 | 9/2018 | Oketani et al. |
| 2018/0363669 A1* | 12/2018 | Sullivan ................. H02K 7/083 |
| 2020/0412198 A1* | 12/2020 | Dymond .................. H02K 5/24 |

FOREIGN PATENT DOCUMENTS

| | | |
|---|---|---|
| EP | 2878827 A1 | 6/2015 |
| GB | 2467966 A | 8/2010 |
| GB | 2493974 A | 2/2013 |
| JP | S60-139145 A | 7/1985 |
| JP | 2000-023414 A | 1/2000 |
| JP | 2004-210017 A | 7/2004 |
| JP | 2013-024059 A | 2/2013 |
| JP | 2016-067083 A | 4/2016 |
| JP | 2017-143723 A | 8/2017 |
| WO | 2017/077585 A1 | 5/2017 |
| WO | 2017/098200 A1 | 6/2017 |
| WO | 2017/098202 A1 | 6/2017 |
| WO | 2017/098203 A1 | 6/2017 |

OTHER PUBLICATIONS

Search Report dated Jul. 18, 2018, directed to GB Application No. 1803348.0; 1 page.

Office Action received for Japanese Patent Application No. 2020-545303, mailed on Nov. 2, 2021, 7 pages (4 pages of English Translation and 3 pages of Original Document).

Office Action received for European Application No. 19708613, mailed on Apr. 13, 2022, 5 pages.

Office Action received for Korean Patent Application No. 10-2020-7025465, mailed on Jul. 13, 2022, 8 pages (4 pages of English Translation and 4 pages of Original Document).

Office Action received for Chinese Patent Application No. 201980016301.4, mailed on Aug. 9, 2022, 16 pages (8 pages of English Translation and 8 pages of Original Document).

\* cited by examiner

ELECTRIC MOTOR

REFERENCE TO RELATED APPLICATIONS

This application is a national stage application under 35 USC 371 of International Application No. PCT/GB2019/050447, filed Feb. 19, 2019, which claims the priority of United Kingdom Application No. 1803348.0 filed Mar. 1, 2018, the entire contents of each of which are incorporated herein by reference.

FIELD OF THE DISCLOSURE

The present disclosure relates to an electric motor.

BACKGROUND OF THE DISCLOSURE

There is a general desire to improve electric machines, such as brushless electric motors, in a number of ways. In particular, improvements may be desired in terms of size, weight, manufacturing cost, efficiency, reliability and noise.

It is becoming more and more common for electric machines such as brushless electric motors to be used a very high speeds, for example at 100 krpm or more. When operating at such high speeds, the motor may have undesirable acoustic characteristics. There is therefore a need to find improvements to provide more desirable acoustic characteristics at high operating speeds.

SUMMARY OF THE DISCLOSURE

According to a first aspect of the present invention there is provided an electric motor comprising: a frame; a rotor assembly comprising a magnet, a bearing assembly, an impeller, and a shaft; and a stator assembly; wherein the bearing assembly comprises a first bearing, a second bearing, and a biasing element between the first and second bearings, the first bearing being soft-mounted to the frame by an o-ring, and the second bearing being mounted to the frame by adhesive.

The electric motor according to the first aspect of the present invention may be advantageous principally as the first bearing is soft-mounted to the frame by an o-ring, and the second bearing is mounted to the frame by adhesive. In particular, this may provide the electric motor with improved acoustic characteristics. The o-ring may at least partially vibrationally isolate the first bearing from the frame, and this may inhibit vibrations, and hence noise, from being transferred between the first bearing and the frame in use. The inventors of the present application have found that such a mounting scheme may reduce the level of at least one of the harmonic tones of the electric motor, for example a harmonic tone of the first bearing, such that the electric motor may operate with a reduced noise level and/or a more desirable tone.

The biasing element located between the first and second bearings may apply a pre-load to the bearings, which may reduce wear of the bearings in use, for example by preventing the bearings from skidding. The biasing element may comprise a spring, for example a coil spring.

By o-ring is meant a resiliently deformable member having a generally toroidal form, such that the o-ring extends annularly about the first bearing. The term o-ring is not limited to only a circular cross-sectional profile, and may include cross-sectional profiles having other shapes, for example polygonal and the like. The o-ring may be over-moulded to the first bearing and/or the frame, or may, for example, comprise a separate component inserted between the first bearing and the frame.

The first bearing may be located closer to the impeller than the second bearing. This may be beneficial as radial forces are most likely to be generated by the impeller, and by mounting the bearing closest to the impeller with an o-ring, the o-ring may absorb any radial forces caused by the impeller spinning during use. Furthermore, by mounting the bearing closest to the impeller with an o-ring, the o-ring may absorb vibrational energy, for example noise, generated by rotation of the impeller, and hence may result in a reduction in noise generated by the electric motor in use. It has been found by the inventors of the present application that soft-mounting the bearing closest to the impeller using an o-ring may reduce the level of at least one of the harmonic tones of the electric motor, for example a harmonic tone of the first bearing, such that the electric motor may operate with a reduced noise level and/or a more desirable tone.

The first bearing and/or the frame may comprise an annular groove within which the o-ring sits. This may be beneficial as it may retain the o-ring in its desired position and inhibit movement of the o-ring which could reduce the effectiveness of the soft mounting provided by the o-ring. Use of an annular groove may enable the use of a larger o-ring, and hence a greater reduction in noise, without the need for the diameter of the bore, and hence the diameter of the electric motor, to be increased to accommodate the o-ring.

Due to the relative sizes of the bearing and the frame, forming the annular groove on the frame rather than the bearing may be beneficial. In particular, as the frame has a greater length than the bearing, a larger annular groove can be formed on the frame than on the bearing. This may enable the use of a larger o-ring, which may increase the surface area of the o-ring in contact with the first bearing, thereby leading to a greater improvement in acoustic characteristics, for example a greater reduction in the level of harmonic tones of the motor.

The o-ring and/or the annular groove may be offset from a centre-point of the first bearing, for example axially offset in a direction parallel to an axis of rotation of the impeller. This may provide an improved reduction in the level of at least one of the harmonic tones of the motor.

The o-ring may be shaped and/or dimensioned to maximise a contact surface area with the first bearing. This may lead to a greater improvement in acoustic characteristics, for example a greater reduction in the level of harmonic tones of the motor. The o-ring may comprise a cross-section shaped such that the o-ring defines an interface along substantially the entirety of the outer race of the first bearing, for example a substantially square cross-section. An outer surface of the o-ring may comprise a taper. This may allow for easier insertion of the o-ring into the bore during manufacture.

The frame may comprise an inner wall and an outer wall, the inner wall defining a bore for supporting the rotor assembly. The first bearing may be soft-mounted to the inner wall, for example within the bore, by the o-ring, and the second bearing may mounted to the inner wall, for example within the bore, by adhesive.

The inner wall may define a substantially uninterrupted surface, for example a sleeve, covering the bearing assembly. This may be beneficial as it may protect the bearing assembly from debris and the like which may pass through the electric motor in use The bearing assembly may be located downstream of the impeller. This may be beneficial as it may result in improved airflow characteristics upon entry of airflow into the impeller compared to, for example, an arrangement in which the bearing assembly is located upstream and within the airflow path of the impeller. This may result in a more efficient electric motor and/or may result in an electric motor having improved acoustic characteristics.

The magnet may be located downstream of the bearing assembly, for example located outside of the bore of the inner wall. This may be beneficial as locating the magnet outside of the bore of the inner wall may enable the magnet to be located closer to the stator assembly, for example without forming an aperture in the inner wall to accommodate the stator assembly. Forming an aperture in the inner wall may be undesirable as it may increase the risk of passage of debris flowing through the electric motor in use to the bearing assembly.

The impeller may be in direct contact with at least a portion of the first bearing, for example with an inner race of the first bearing. This may be beneficial as it may allow for more efficient transfer of vibrational energy from the impeller to the o-ring in use. The impeller may be mounted to the shaft such that at least a portion of the impeller is in direct contact with at least a portion of the first bearing.

The stator assembly may be soft mounted to the frame, for example to the inner wall, by a stator mounting member. The stator mounting member may, for example, comprise a resiliently deformable mounting member. This may provide the electric motor with improved acoustic characteristics. In particular, the soft-mounting may at least partially vibrationally isolate the stator assembly from the frame, and this may inhibit vibrations, and hence noise, from being transferred between the stator assembly and the frame in use.

The stator assembly may be mounted to an end of the inner wall, for example to an axially downstream end of the inner wall. The stator mounting member may be shaped and dimensioned to correspond to an end of the inner wall, for example an axially downstream end of the inner wall, for example such that there is substantially no direct contact between the end of the inner wall and the stator assembly. The stator mounting member may be substantially toroidal in form. The stator mounting member may comprise an elastomeric material.

BRIEF DESCRIPTION OF THE FIGURES

In order to better understand the present invention according to various aspects, and to show more clearly how various aspects of the invention may be put into effect, the invention according to various aspects will now be described, by way of example, with reference to the following drawings.

DETAILED DESCRIPTION OF THE DISCLOSURE

Figure 1:
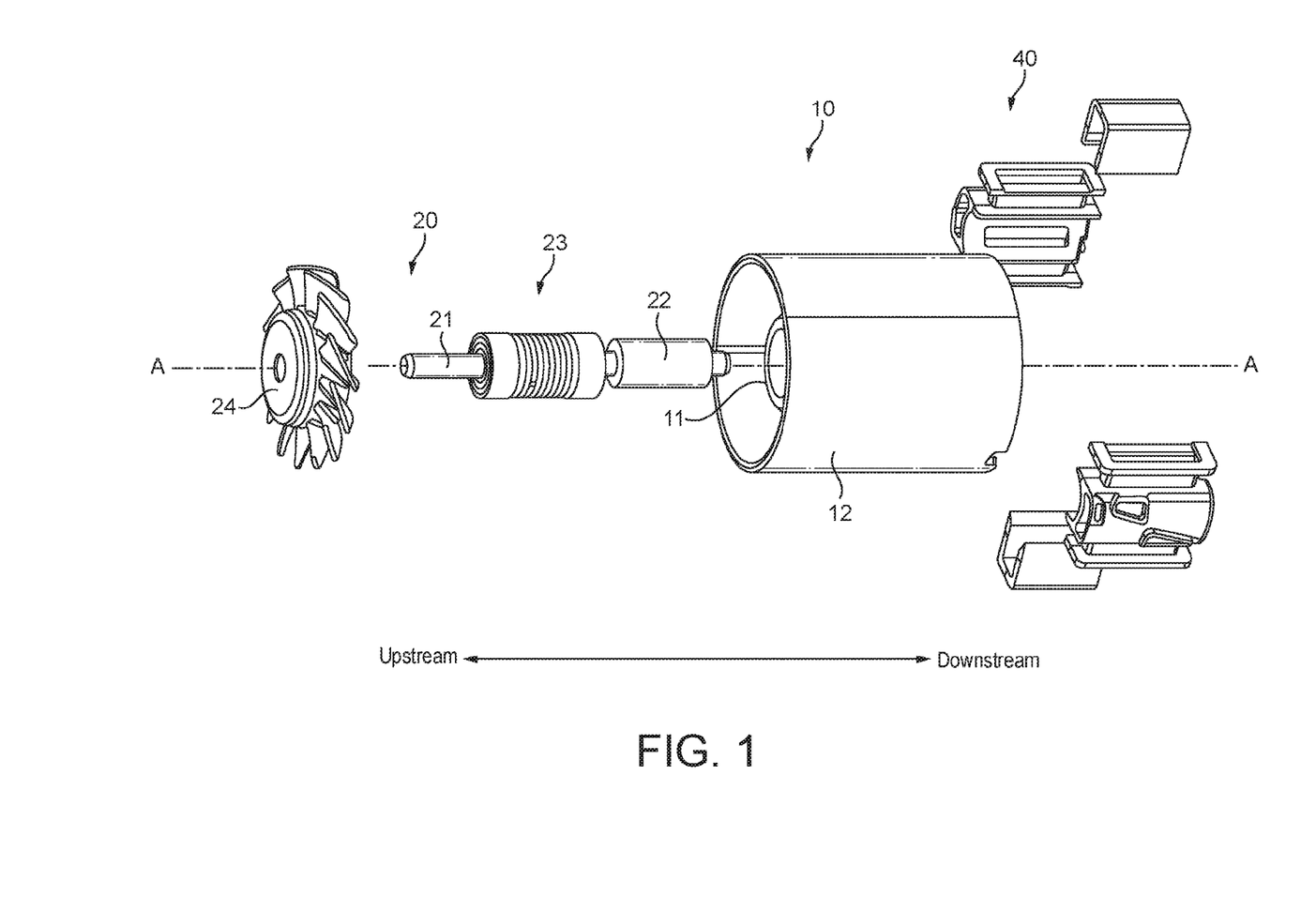
FIG. 1 is an exploded perspective view of an electric motor according to the present invention.

For the sake of clarity, the term "axial" is intended to mean in the direction of an axis running along a rotational axis of the motor as depicted by axis A-A in FIG. 1. In addition, the directional terms "upstream" and "downstream" referred to herein refer to the direction of airflow through the motor when in use and are further clarified by the double headed arrow in FIG. 1.

Figure 2:
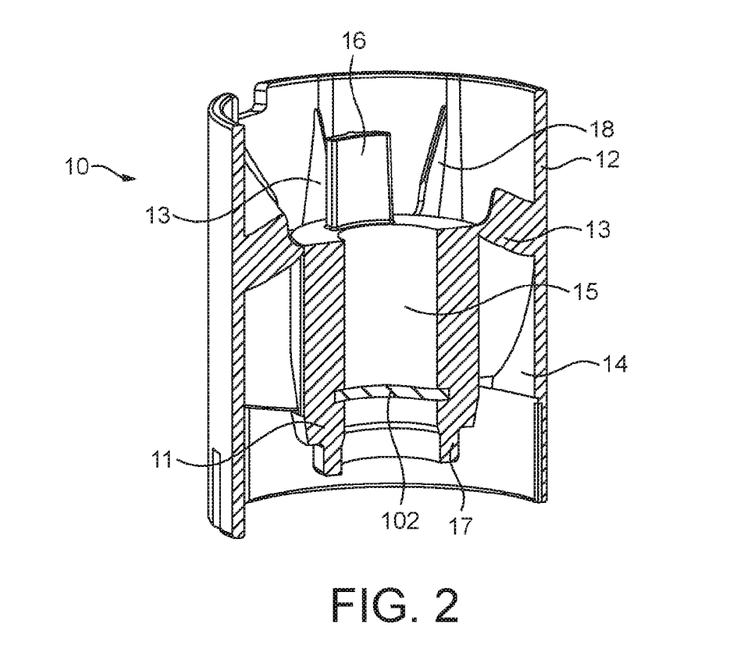
FIG. 2 is a cross section through a frame of the electric motor of FIG. 1.

FIG. 1 is an exploded perspective view of an electric motor 1. The motor 1 comprises a frame 10, a rotor assembly 20 and a stator assembly 40. A cross-section through the frame 10 is shown in FIG. 2. The frame 10 comprises an inner wall 11 and an outer wall 12. The outer wall 12 surrounds the inner wall 11 such that an annular channel 14 is defined between them. A number of diffuser vanes 13 extend between the inner wall 11 and the outer wall 12 through the annular channel 14. The inner wall 11 is shorter in length than the outer wall 12, and the inner wall 11 is positioned such that the outer wall 12 extends axially beyond the inner wall 11 in both the upstream and downstream directions. In alternative embodiments, the inner wall 11 may be positioned differently such that the outer wall 12 extends beyond the inner wall 11 in just one of the upstream or downstream directions.

The frame 10 is formed of zinc and can be formed, for example, by machining or die-casting, or a combination method using both machining and die-casting. Zinc is an acoustically dull material and so a zinc frame 10 is able to absorb acoustic frequencies generated by the motor 1 during use. The zinc frame 10 therefore acts to reduce the overall level of noise generated by a product inside of which the motor 1 is incorporated.

The diffuser vanes 13 extend between the inner wall 11 and the outer wall 12, and extend along substantially the whole length of the inner wall 11. In addition, the diffuser vanes 13 have tail portions 18 that extend axially downstream beyond the inner wall 11 to the outer wall 12. The diffuser vanes 13 are therefore longer at a radially outer part of the annular channel 14 than at a radially inner part of the annular channel 14. This has the benefit that the diffuser vanes 13 have a longer effective length acting on the airflow whilst still allowing the size and weight of the motor 1 to be kept to a minimum by reducing the axial length of the inner wall 11.

The inner wall 11 is cylindrical and defines a bore 15. The inner wall 11 can support the rotor assembly 20 within the bore 15 when the motor 1 is assembled. In addition, the inner wall 11 has a lug 16 that extends from one end of the inner wall 11 in an axial direction. In particular the lug 16 extends axially in a downstream direction. The lug 16 provides a mounting point onto which the stator assembly 40 can be easily mounted in order that the stator assembly 40 can be secured to the frame 10. FIG. 2 shows a single lug 16, however multiple lugs 16 may be provided depending on the number of mounting points required on the stator and other requirements of the motor 1. Mounting of the stator assembly 40 to the lugs 16 of the frame 10 will be described in more detail below with reference to FIGS. 5 and 6.

The inner wall 11 has an axially extending annular protrusion 17 which extends from an end of the inner wall 11 in an opposite direction to the lug 16. This axially extending annular protrusion 17 can be received into a complementary recess 29 on the impeller 24 to form a labyrinth seal. This will be described in more detail below with reference to FIG. 4.

Figure 3:
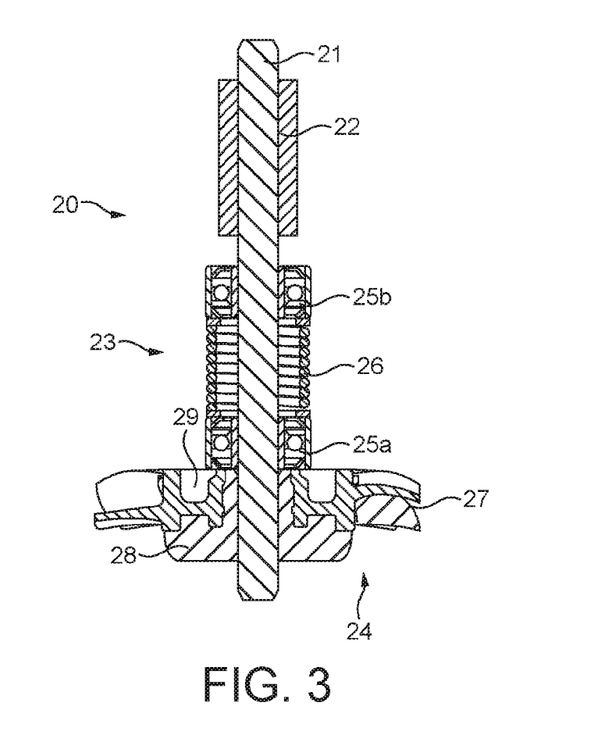
FIG. 3 is a cross-section through the rotor assembly of the electric motor of FIG. 1.

The rotor assembly 20 comprises a shaft 21, a magnet 22, a bearing assembly 23 and an impeller 24. A cross-section through the rotor assembly 20 is shown in FIG. 3. The magnet 22, bearing assembly 23 and impeller 24 are all fixed directly to the shaft 21 by one or a combination of an interference fit and adhesive.

The magnet 22 is a bonded permanent magnet of the sort typically used in permanent magnet brushless motors. In the example shown, the magnet 22 is a four-pole permanent magnet. The bearing assembly 23 comprises a pair of bearings 25a, 25b and a spring 26 separating the bearings 25a, 25b. The spring 26 acts to pre-load each of the outer races of the bearings 25a, 25b to reduce wear of the bearings 25a, 25b during use. Washers may also be provided between the spring 26 and each of the bearings 25a, 25b.

As described above, the rotor assembly 20 is supported in the frame 10 by the inner wall 11. The bearing assembly 23 is fixed inside the bore 15 of the inner wall 11 such that the inner wall 11 of the frame 10 acts as a protective sleeve around the bearing assembly 23. This eliminates the need for the bearing assembly 23 to have a separate protective sleeve, and helps to reduce the size and weight of the motor 1.

An outer race of the bearing 25a closest to the impeller 24 is fixed to the inside circumference of the inner wall 11, in the bore 15, by an o-ring 100 located in an annular groove 102 formed in the inside circumference of the inner wall 11, in the bore 15. The o-ring 100 acts to at least partially vibrationally isolate the bearing 25a from the frame 10. This may allow the motor to have improved acoustic characteristics, and may, for example, result in a reduction in the level of at least one of the harmonic tones of the motor 1. The shape, size, and materials of the o-ring 100 may be chosen to reduce the level of a selected harmonic tone, and it is presently preferred that the o-ring 100 has as great a contact surface area with the first bearing 25a as possible to provide as great a reduction as possible.

The outer race of the bearing 25b furthest away from the impeller 24 is fixed to the inside circumference of the inner wall 11, in the bore 15, by adhesive 104. The adhesive 104 acts to absorb axial forces generated by the impeller 24 in use. The type of adhesive 104 may be chosen depending on the desired characteristics of the motor 1. For example, a soft setting adhesive may be chosen to improve the acoustic characteristics of the motor 1.

The impeller 24 shown in the Figures is an axial impeller with a plurality of blades 27 spaced circumferentially around, and extending radially out from, a central hub 28. In a presently preferred embodiment there are thirteen blades 27.

Figure 4:
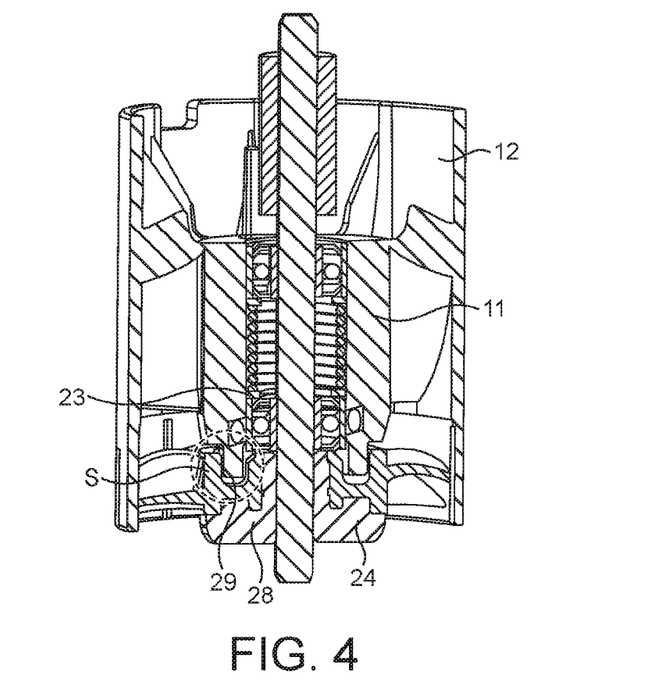
FIG. 4 is a cross section through the assembled frame and rotor assembly of FIGS. 2 and 3.

FIG. 3 shows that the hub 28 of the impeller 24 comprises a recess 29 in the downstream side of the hub 28. By having a recess 29, this further decreases the weight of the impeller 24, which counteracts even more of the weight added by using zinc to form the frame 10. In addition, the recess 29 is annular and provides a cavity into which an axially extending portion of the inner wall of the frame can extend. This creates a labyrinth seal inside the hub 28 of the impeller 24 which prevents foreign objects, such as hair and dust, from entering into the bearing assembly 23 which could damage the rotor assembly 20 and significantly reduce the lifetime of the motor 1. The labyrinth seal can be seen in FIG. 4 which shows a cross section through the assembled frame 10 and rotor assembly 20. The labyrinth seal is highlighted at area S. FIG. 4 shows how the inner wall 11 of the frame 10 acts as a protective sleeve around the bearing assembly 23, as previously described.

Figure 5:
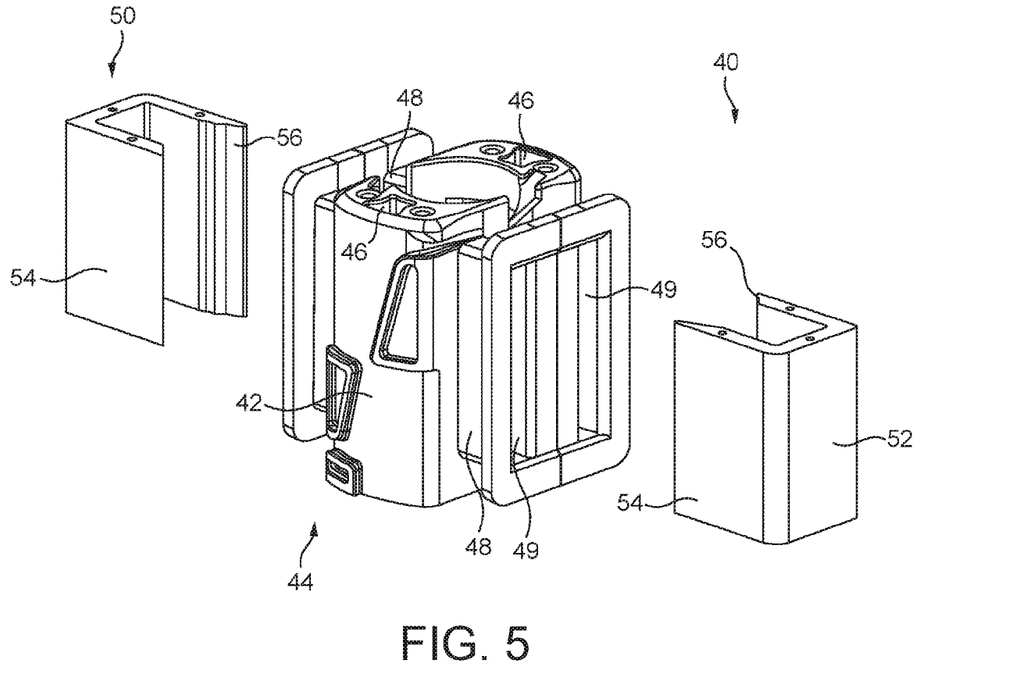
FIG. 5 is a partially exploded perspective view of a stator assembly of the electric motor of FIG. 1.

FIG. 5 shows the stator assembly 40. The stator assembly 40 comprises two c-shaped stator cores 50 and a bobbin assembly 44. Each c-shaped core 50 (also referred to as a c-core) comprises a back 52 and two pole arms 54 extending from the back 52. At the end of each pole arm 54 is a pole face 56. The bobbin assembly 44 comprises a centre portion 42 and outwardly extending arm portions 48 that extend from the centre portion 42. The centre portion 42 defines a bore which surrounds the magnet 22 of the rotor assembly 20 when the motor is assembled. Windings (not shown) for inducing a magnetic field in the c-cores 50 can be wound around the arm portions 48 of the bobbin assembly 44. The arm portions 48 are provided with through holes 49 which allow the pole arms 54 of the c-cores 50 to slot through the arm portions 48 of the bobbin assembly 44 such that a winding is positioned around each pole arm 54. The through holes 49 in the arm portions also extend through to the centre portion 42 of the bobbin assembly 44, and openings are provided in the centre portion 42 such that the pole faces 56 of the c-cores 50 are exposed to the magnet 22 when the motor is assembled.

Figure 6:
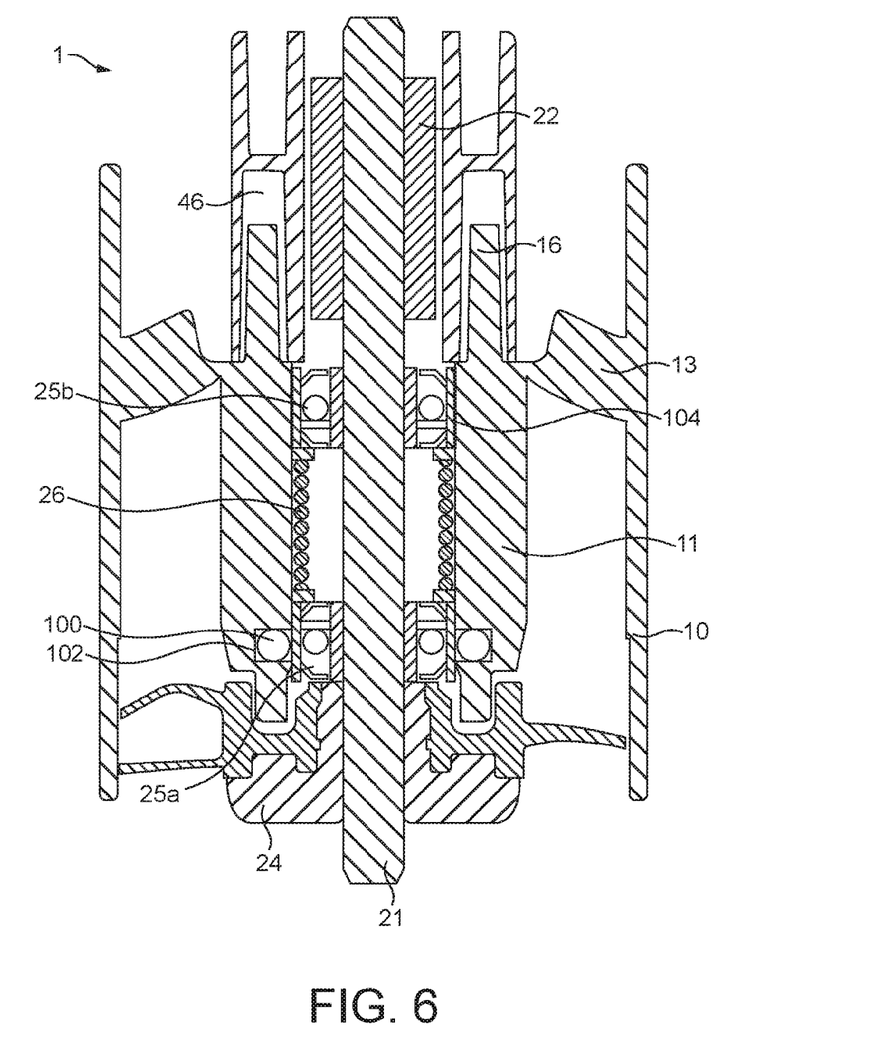
FIG. 6 is a cross-section through the electric motor of FIG. 1.

The bobbin assembly 44 comprises recesses 46 that are configured to align with the lugs 16 on the frame 10 such that the stator assembly 40 can be fixed to the frame 10. The lugs 16 are receivable into the recesses 46, and can be fixed in place using adhesive and/or interference fit. FIG. 6 shows a cross section through the assembled motor 1. This view shows lugs 16 positioned inside the recesses 46 of the bobbin assembly 44. The recesses 46 may be large enough so as to be able to accommodate the lugs 16 as well as a volume of adhesive. During assembly of the motor 1, adhesive may be applied into the recesses 46, or to the outside of the lugs 16, or both prior to bringing the stator assembly 40 and the frame 10 together.

Figure 7:
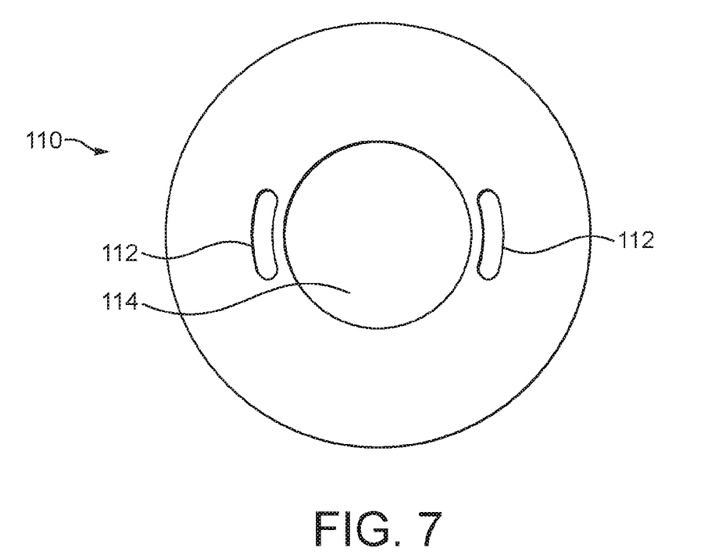
FIG. 7 is a schematic view of a stator mounting member for use with the electric motor of FIG. 1.

In some embodiments a stator mounting member 110, as shown schematically in FIG. 7, is provided for mounting the stator assembly 40 to the inner wall 11. The stator mounting member 110 is a toroidal elastomeric member having a central bore 114 for receiving the shaft 21, and recesses through which the lugs 16 extend. The material of the stator mounting member 110 can be chosen such that the stator mounting member 110 at least partially vibrationally isolates the stator assembly 40 from the inner wall 11, and hence the frame 10, and thus provides improved acoustic characteristics, such as a reduction in the level of one or more harmonic tones of the motor 1. The stator mounting member 110 may have a Shore A hardness of between 40 and 90 Shore A.

Figure 8:
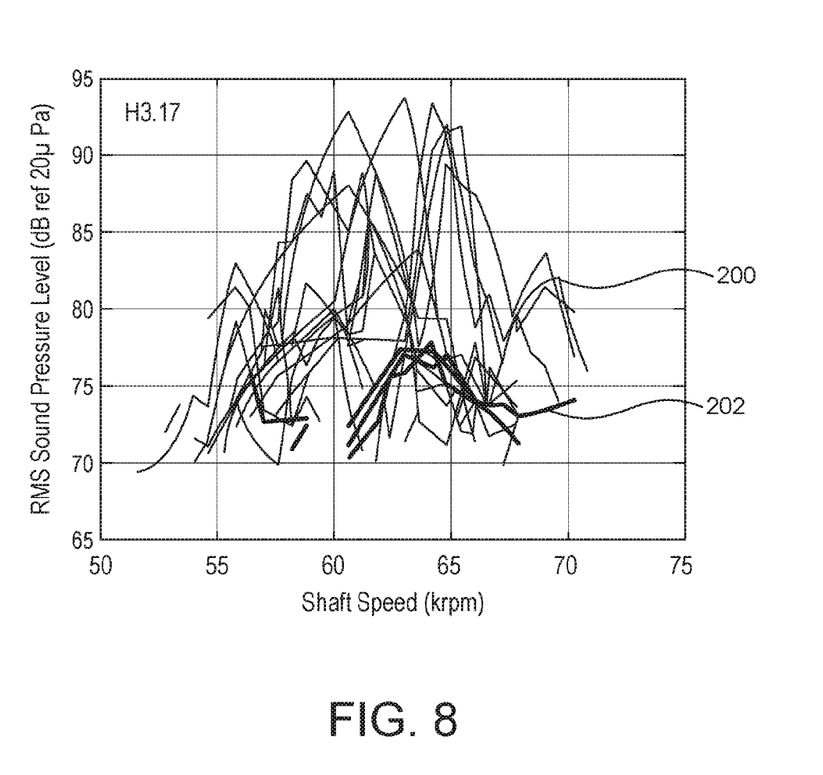
FIG. 8 is a plot showing a reduction in bearing tone H3.17 provided by using the electric motor of FIG. 1.

An example of the benefits provided by the present invention can be seen in FIG. 8. The motor 1 is typically run at speeds in the range of 50-120 krpm. In the absence of the o-ring 100 mounting the first bearing 25a to the inner wall 11, a corresponding motor run in the same speed range shows a high bearing tone H3.17, as can be seen from the group of lines 200. The inventors of the present invention have found that the introduction of the o-ring 100 to soft mount the first bearing 25a, closest to the impeller 24, to the inner wall 11 of the frame 10 can result in a significant decrease in the level of H3.17, as can be seen from the group of lines 202. This provides the motor 1 with improved acoustic characteristics.

The choice of material of the o-ring 100, as well as the size of the o-ring 100 and the surface area of contact between the outer race of the first bearing 25a and the o-ring 100, can also influence the level of harmonic tones of the motor 1. It is presently preferred that as great a surface area of contact between the outer race of the first bearing 25*a* and the o-ring 100 as is possible is utilised.

It has further been found that use of a material having a Shore A hardness in the range of 40-90 Shore A for the o-ring 100 can result in improved reduction in the level of harmonic tones of the motor 1.

The invention claimed is:

1. An electric motor comprising:
   a frame;
   a rotor assembly comprising a magnet, a bearing assembly, an impeller, and a shaft, wherein the bearing assembly comprises:
      a first bearing soft-mounted to the frame by an O-ring;
      a second bearing mounted to the frame by adhesive; and
      a biasing element between the first and second bearings, wherein the first bearing is located closer to the impeller than the second bearing; and
   a stator assembly comprising a plurality of c-shaped stator cores, wherein the stator assembly is soft-mounted to the frame by a deformable stator mounting member.

2. The electric motor of claim 1, wherein the frame comprises an annular groove within which the O-ring sits.

3. The electric motor of claim 1, wherein the frame comprises an uninterrupted surface covering the bearing assembly.

4. The electric motor of claim 1, wherein the bearing assembly is located downstream of the impeller.

5. The electric motor of claim 1, wherein the frame comprises an inner wall and an outer wall, the inner wall having a bore for receiving the bearing assembly, and the magnet is located downstream of the bearing assembly, outside the bore of the inner wall.

6. The electric motor of claim 1, wherein the impeller is in direct contact with at least a portion of the first bearing.

7. The electric motor of claim 1, wherein the O-ring is offset from a centre-point of the first bearing.

8. The electric motor of claim 7, wherein the O-ring is axially offset in a direction parallel to an axis of rotation of the impeller.

9. The electric motor of claim 1, wherein the frame includes a protrusion that cooperates with a recess of the impeller to form a seal.

10. The electric motor of claim 1, wherein the stator assembly further comprises a bobbin assembly having a centre portion and a plurality of arm portions that extend from the centre portion.

11. The electric motor of claim 10, wherein the centre portion of the bobbin assembly includes a bore configured to receive the magnet of the rotor assembly.

12. The electric motor of claim 10, wherein the stator assembly further comprises a winding wound around an arm portion of the bobbin assembly that is configured to induce a magnetic field in a c-shaped stator core of the plurality of c-shaped stator cores.

13. The electric motor of claim 12, wherein:
   each arm portion of the plurality of arm portions of the bobbin assembly includes an aperture; and
   each c-shaped stator core of the plurality of c-shaped stator cores slots into a corresponding aperture of the bobbin assembly.

14. The electric motor of claim 1, wherein the frame comprises a lug that extends from an inner wall of the frame in an axial direction, the lug being a mounting point for the stator assembly.

15. The electric motor of claim 14, wherein the stator assembly comprises a recess configured to interface with the lug of the frame.

* * * * *